(12) United States Patent
Siomina et al.

(10) Patent No.: US 8,942,720 B2
(45) Date of Patent: Jan. 27, 2015

(54) POSITIONING NODE, USER EQUIPMENT AND METHODS THEREIN

(75) Inventors: Iana Siomina, Solna (SE); Tao Cui, Upplands Väsby (SE); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 311 days.

(21) Appl. No.: 13/321,006

(22) PCT Filed: Jun. 13, 2011

(86) PCT No.: PCT/SE2011/050725
§ 371 (c)(1),
(2), (4) Date: Nov. 17, 2011

(87) PCT Pub. No.: WO2012/023893
PCT Pub. Date: Feb. 23, 2012

(65) Prior Publication Data
US 2012/0149392 A1    Jun. 14, 2012

Related U.S. Application Data

(60) Provisional application No. 61/374,037, filed on Aug. 16, 2010.

(51) Int. Cl.
*H04W 24/00* (2009.01)
*H04W 64/00* (2009.01)
(52) U.S. Cl.
CPC ................................ *H04W 64/00* (2013.01)
USPC .................. 455/456.1; 455/456.2; 455/456.5; 455/456.6
(58) Field of Classification Search
USPC ............... 455/456.1–456.6, 422.1, 404.2, 455/433–434, 435.1, 439, 457, 466, 550.1, 455/552.1, 556.2, 560–561; 701/300, 451, 701/454, 467–469, 485, 495, 516–517
See application file for complete search history.

(56) References Cited

U.S. PATENT DOCUMENTS 6,950,663 B2 * 9/2005 Pihl et al. .................... 455/456.5
8,447,319 B2 * 5/2013 Carlson et al. .............. 455/456.1
(Continued)

FOREIGN PATENT DOCUMENTS

WO         00/78084 A1    12/2000

OTHER PUBLICATIONS

ETSI TS 136 305 v9.3.0 (Jul. 2010) LTE; Evolved Universal Terrestrial Radio Access Network (E-UTRAN); Stage 2 functional specification of User Equipment (UE) positioning in E-UTRAN (3GPP TS 36.305 version 9.3.0 Release 9).*

(Continued)

*Primary Examiner* — Meless Zewdu
(74) *Attorney, Agent, or Firm* — Coats & Bennett, P.L.L.C.

(57) ABSTRACT

Methods in a user equipment (UE) for enabling positioning of the UE in a radio communication network having a radio network node and a positioning node. The UE is served in a first cell controlled by the radio network node, and the UE knows or can obtain a system frame number of at least one cell. The UE receives, from the positioning node, a message having positioning assistance data, which includes information associated with the at least one cell for which the system frame number is known or can be obtained by the UE. The UE also performs a positioning measurement using the positioning assistance data and the system frame number of the at least one cell to enable positioning of the UE.

32 Claims, 6 Drawing Sheets

(56) References Cited

U.S. PATENT DOCUMENTS

| | | | |
|---|---|---|---|
| 8,509,102 B2* | 8/2013 | Krishnamurthy et al. | 370/252 |
| 2004/0023671 A1* | 2/2004 | Rudolf et al. | 455/456.5 |
| 2004/0166856 A1 | 8/2004 | Niemenmaa | |
| 2005/0007980 A1 | 1/2005 | Landais et al. | |
| 2005/0136938 A1* | 6/2005 | Kang | 455/452.2 |
| 2006/0014531 A1* | 1/2006 | Nam et al. | 455/418 |
| 2008/0287140 A1* | 11/2008 | Lee et al. | 455/456.2 |
| 2010/0210285 A1* | 8/2010 | Pande et al. | 455/456.1 |
| 2010/0239034 A1* | 9/2010 | Lee et al. | 375/260 |
| 2010/0323718 A1* | 12/2010 | Jen | 455/456.1 |
| 2011/0117925 A1* | 5/2011 | Sampath et al. | 455/456.1 |
| 2012/0015667 A1* | 1/2012 | Woo et al. | 455/456.1 |
| 2012/0149430 A1 | 6/2012 | Siomina | |

OTHER PUBLICATIONS

ETSI TS 125 305 v3.6.0 (Jun. 2001) Universal Mobile Telecommunications System (UMTS); Stage 2 Functional Specification of UE Positioning in UTRAN (3GPP TS 25.305 version 3.6.0 Release 1999; reference RTS/TSGR-0225305UR6.*

PCT International Search Report, mailed Dec. 16, 2011, in connection with International Application No. PCT/SE2011/050725.

ETSI TS 136 305 V9.3.0 LTE; Evolved Universal Terrestrial Radio Access Network (E-UTRAN); Stage 2 functional specification of User Equipment (UE) positioning in E-UTRAN, Jul. 2010.

Tanner, Rudolf et al. "WCDMA—Requirements and Practical Design, Chapter 12: Future Developments" Mar. 12, 2004, Wiley and Sons, XP002663414, ISBN: 0-470-86177-0.

3GPP TS 36.355 V9.2.1 Technical Specification Group Radio Access Network; Evolved Universal Terrestrial Radio Access (E-UTRA); LTE Positioning Protocol (LPP) (Release 9), Jun. 2010.

Siemens "Air Interface Methods for TDD Location Services" 3GPP Draft R1-00-1123, 3GPP RAN WG1, Berlin, Germany Aug. 22-25, 2000, XP050093046.

Ericsson et al. "One cell with known SFN in OTDOA assistance data" 3GPP Draft R2-105890, 3GPP, TSG RAN2 Mtg #71bis, Xi'an, China, Oct. 11-15, 2010, XP050463039.

3GPP TS 36.211 V9.1.0 Technical Specification Group Radio Access Network; Evolved Universal Terrestrial Radio Access (E-UTRA); Physical Channels and Modulation (Release 9); Mar. 2010.

3GPP TS 36.300 V9.4.0 Technical Specification Group Radio Access Network; Evolved Universal Terrestrial Radio Access (E-UTRA) and Evolved Universal Terrestrial Radio Access Network (E-UTRAN); Overall description; Stage 2 (Release 9), Jun. 2010.

EPO, International Search Report in PCT/SE2011/050990, Nov. 22, 2011.

EPO, Written Opinion in PCT/SE2011/050990, Nov. 22, 2011.

Ericsson "Inter NSE Cell Change for LCS for GPRS", 3GPP TSG-GERAN Meeting #7, Tdoc G2-012712, Nov. 28, 2001.

ZTE "Discussion on UE Positioning in Handover", 3GPP TSG RAN #67, R2-094728, Aug. 18, 2009, Shenzhen, China.

Qualcomm Europe "Continuity at Handover for OTDOA", 3GPP TSG RAN SG2 #68, R2-096966, Nov. 9, 2009, Jeju, Korea.

3GPP TS 36.133 V9.4.0 Evolved Universal Terrestrial Radio Access (E-UTRA), Requirements for Support of Radio Resource Management (Release 9), Jun. 2010, pp. 43-84, Clause 8.

PCT Written Opinion, mailed Dec. 16, 2011, in connection with International Application No. PCT/SE2011/050725.

PCT Second Written Opinion, mailed Jul. 13, 2012, in connection with International Application No. PCT/SE2011/050725.

3rd Generation Partnership Project. "3rd Generation Partnership Project; Technical Specification Group Radio Access Network; Physical layer; Measurements (FDD) (Release 11)." 3GPP TS 25.215, V11.0.0, Dec. 2011, Sophia Antipolis Valbonne, France, pp. 1-24.

3rd Generation Partnership Project. "3rd Generation Partnership Project; Technical Specification Group Radio Access Network; Evolved Universal Terrestrial Radio Access (E-UTRA); Physical channels and modulation (Release 12)." 3GPP TS 36.211, V12.1.0, Mar. 2014, Sophia Antipolis Valbonne, France, pp. 1-120.

3rd Generation Partnership Project. "Autonomous Muting Indication in OTDOA Assistance Information." 3GPP TSG-RAN Meeting #47, RP-100191, Change Request, TS 36.355, Vienna, Austria, Mar. 16-19, 2010, pp. 1-5.

* cited by examiner

POSITIONING NODE, USER EQUIPMENT AND METHODS THEREIN

TECHNICAL FIELD

Embodiments herein relate to a positioning node, a user equipment and methods therein, in particular, to enable positioning of the user equipment in a radio communications network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies. A radio communications network comprises radio base stations providing radio coverage over at least one respective geographical area forming a cell. User equipments (UE) are served in the cells by the respective radio base station and are communicating with respective radio base station. The user equipments transmit data over a radio interface to the radio base stations in uplink (UL) transmissions and the radio base stations transmit data to the user equipments in downlink (DL) transmissions.

The possibility of identifying a geographical location of a user equipment in the radio communications network has enabled a large variety of commercial and non-commercial services, e.g., navigation assistance, social networking, location-aware advertising, emergency calls, etc. Different services may have different positioning accuracy requirements imposed by the positioning application. In addition, some regulatory requirements on the positioning accuracy for basic emergency services exist in some countries, e.g. 300 meters in Federal Communications Commission (FCC) Enhanced 9-1-1 in United States.

In many environments, a user equipment's position may be accurately estimated by using positioning methods based on the Global Positioning System (GPS). Nowadays, radio communications networks also often have a possibility to assist user equipments in order to improve the user equipment's receiver sensitivity and GPS start-up performance, e.g. as Assisted-GPS (A-GPS) positioning do. GPS or A-GPS receivers may, however, not necessarily be available in all user equipments. Furthermore, GPS is known to often fail in indoor environments and urban canyons. A complementary terrestrial positioning method, called Observed Time Difference of Arrival (OTDOA), has therefore been standardized by 3GPP. In addition to OTDOA, the LTE standard also specifies methods, procedures, and signaling support for Enhanced Cell ID (E-CID) and Assisted-Global Navigation Satellite System (A-GNSS) positioning. In future, Uplink Time Difference of Arrival (UTDOA) may also be standardized for LTE, which is a real time locating technology that uses multilateration based on timing of received uplink signals. Multilateration is the process of locating an object by accurately computing the time difference of arrival (TDOA) of a signal emitted from that object to three or more receivers.

With OTDOA, a user equipment measures the timing differences for downlink reference signals received from multiple distinct locations. For each measured neighbor cell, the user equipment measures Reference Signal Time Difference (RSTD) which is the relative timing difference between neighbor cell and the reference cell. The user equipment position estimate is then found as the intersection of hyperbolas, which is a geometrical curve, corresponding to the measured RSTDs. At least three measurements from geographically dispersed radio base stations with a good geometry are needed to solve for two coordinates of the user equipment and the user equipment receiver's clock bias. In order to solve for position, precise knowledge of the transmitter locations and transmit timing offset is needed. Position calculation may be conducted, for example, by a positioning server, e.g. Enhanced Serving Mobile Location Centre (SMLC), Secure User Plane Location (SUPL) Location Platform (SLP) in LTE, or the user equipment. The former approach corresponds to the user equipment-assisted positioning mode, and the latter corresponds to the user equipment-based positioning mode.

To enable positioning in LTE and facilitate a positioning measurement of a proper quality and for a sufficient number of distinct locations, new physical signals dedicated for positioning e.g. Positioning Reference Signals (PRS), have been introduced and low-interference positioning subframes have been specified in 3GPP.

PRSs are transmitted from one antenna port, e.g. antenna port R6, according to a pre-defined pattern. A frequency shift, which is a function of Physical Cell Identity (PCI), may be applied to the specified PRS patterns to generate orthogonal patterns and modelling the effective frequency reuse of six patterns, which makes it possible to significantly reduce neighbour cell interference on the measured PRS and thus improve a positioning measurement. Even though PRS have been specifically designed for a positioning measurement and in general are characterized by better signal quality than other reference signals, the standard does not mandate using PRS. Other reference signals, e.g., cell-specific reference signals (CRS) may also be used for a positioning measurement.

PRS are transmitted in a predefined pattern such as predefined positioning subframes grouped by a number of consecutive subframes (NPRS), i.e. one positioning occasion. Positioning occasions occur periodically with a certain periodicity of the number N of subframes, i.e. the time interval between two positioning occasions. The standardized periods are 160, 320, 640, and 1280 ms, and the number of consecutive subframes are 1, 2, 4, and 6 stated in 3GPP TS 36.211.

The OTDOA and other positioning methods such as enhanced cell ID are to be used also for emergency calls. Hence the response time of these measurements should be as low as possible to meet the emergency call requirements. Today, the user equipment may provide erroneous positioning measurements since the positioning measurements may rely on wrong assumptions made by the user equipment which may also be inconsistent with the information at the positioning node providing the positioning assistance data. Further, inconsistency in the implementation of the positioning parameters calculation with the network assumption on how the user equipment will do this may also lead to different interpretation of the parameters in the positioning assistance data by both sides and thus erroneous measurements in the end. The required positioning accuracy in a real network can thus not be ensured and the UE may not fulfil the positioning measurement requirements. In some systems this may be solved by a higher complexity in the user equipment e.g. the user equipment searches reference signals over a longer time to detect the reference signals. However, this will require more memory and more time and power for processing as well as this will likely to also violate positioning requirements such as measurement accuracy or measurement reporting delay requirements.

SUMMARY

An objective of embodiments herein is to enable a positioning of a user equipment in a radio communications network that is accurate in an efficient manner.

According to an aspect of embodiments herein the object is achieved by a method in a user equipment for enabling positioning of the user equipment in a radio communications network. The user equipment is served in a first cell controlled by a radio network node and the user equipment knows or can obtain a system frame number of at least one cell. A positioning node and the radio network node are comprised in the radio communications network.

The user equipment receives, from the positioning node, a message comprising positioning assistance data. The positioning assistance data comprises information associated with the at least one cell for which the system frame number is known or can be obtained by the user equipment. The user equipment then performs a positioning measurement using the positioning assistance data and the system frame number of the at least one cell to enable positioning of the user equipment.

Furthermore, a user equipment for enabling positioning of the user equipment in a radio communications network is provided herein. The user equipment is configured to be served in a first cell controlled by a radio network node and configured to know or to obtain a system frame number of at least one cell. The radio communications network comprises a positioning node and the radio network node. The user equipment comprises a receiver configured to receive, from the positioning node, a message comprising positioning assistance data. The positioning assistance data comprises information associated with the at least one cell for which the system frame number is known or can be obtained by the user equipment. Furthermore, the user equipment comprises a performing circuit configured to perform a positioning measurement using the positioning assistance data and the system frame number of the at least one cell to enable positioning of the user equipment.

According to an additional aspect of embodiments herein the object is achieved by a method in a positioning node for enabling positioning of a user equipment in a radio communications network. The user equipment is served in a first cell controlled by a radio network node. The positioning node, the user equipment, and the radio network node are comprised in the radio communications network. The positioning node determines at least one cell for which a system frame number is known or can be obtained by the user equipment. The positioning node generates a message comprising positioning assistance data, which positioning assistance data comprises information associated with the at least one cell. The positioning node transmits the message to the user equipment, which positioning assistance data in the message enables positioning of the user equipment.

Additionally, a positioning node for enabling positioning of a user equipment in a radio communications network is herein provided. The user equipment is served in a first cell controlled by a radio network node. The positioning node comprises a determining circuit configured to determine at least one cell for which a system frame number is known or can be obtained by the user equipment. The positioning node also comprises a generating circuit configured to generate a message comprising positioning assistance data. The positioning assistance data comprises information associated with the at least one cell. The positioning node further comprises a transmitting circuit configured to transmit the message to the user equipment, which positioning assistance data in the message enables positioning of the user equipment.

By adding that the positioning node sends positioning assistance data of a cell that the user equipment knows or can obtain system frame number of, the positioning measurement at the user equipment, as this will be performed with the aid of the system frame number giving timing information, will be more accurate in an efficient manner and hence enabling the positioning node, as well as the user equipment, to position the user equipment in a more accurate manner as well.

BRIEF DESCRIPTION OF THE DRAWINGS

Embodiments will now be described in more detail in relation to the enclosed drawings, in which.

DETAILED DESCRIPTION

Figure 1:
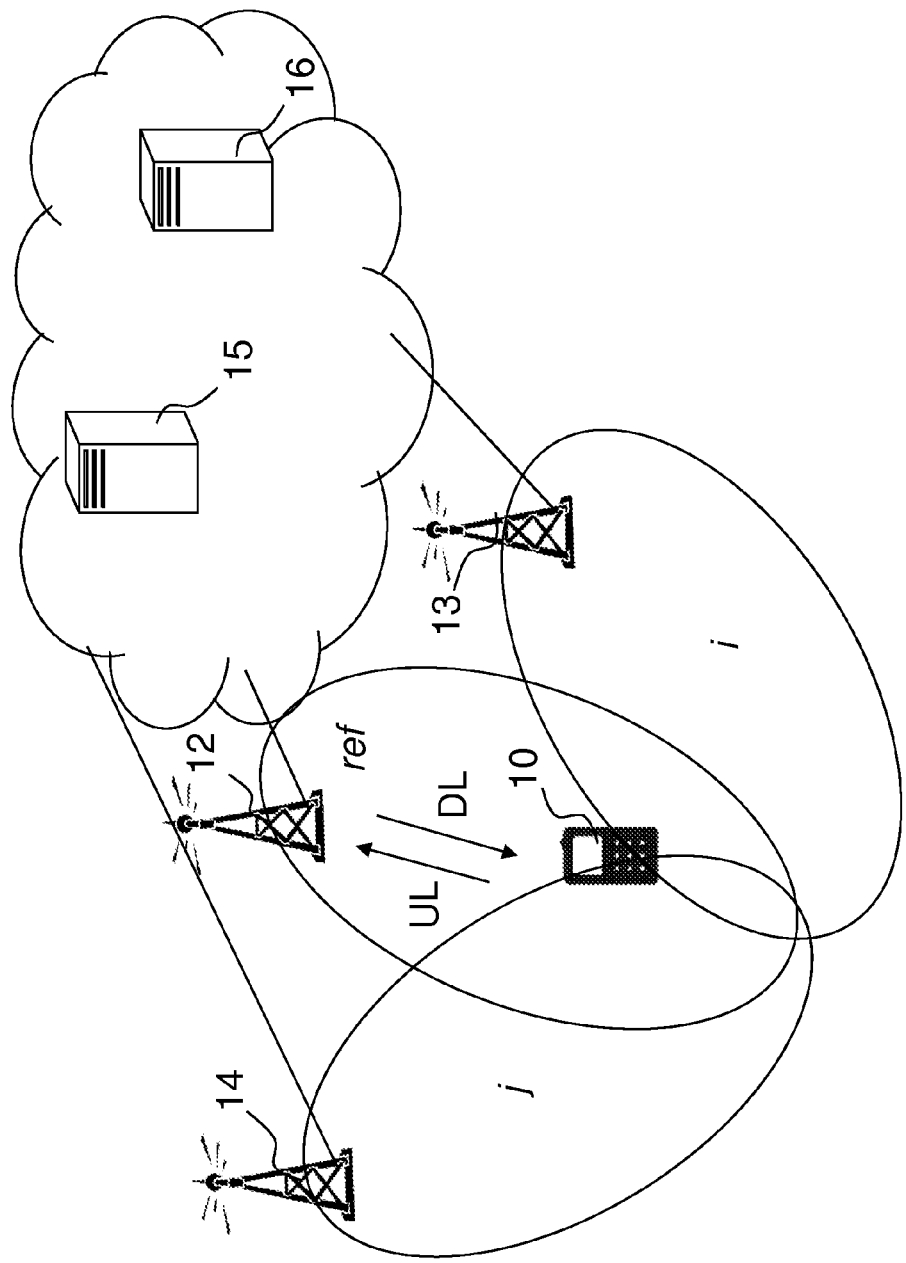
FIG. 1 is a schematic overview of a radio communications network.

FIG. 1 is a schematic overview of a radio communications network such as a Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), network just to mention a few possible implementation. The radio communications network comprises a radio network node, such as a first radio base station 12, providing radio coverage over at least one geographical area forming a first cell 'ref'. A user equipment 10 is served in the first cell 'ref' by the first radio base station 12 and is communicating with the first radio base station 12. The user equipment 10 transmits data over a radio interface to the first radio base station 12 in an uplink (UL) transmission and the first radio base station 12 transmits data to the user equipment 10 in a downlink (DL) transmission. The radio communications network may further comprise a second radio base station 13. The second radio base station 13 provides radio coverage over another geographical area forming a second cell i. The radio communications network may further comprise a third radio base station 14. The third radio base station 14 provides radio coverage over another geographical area forming a third cell j. Furthermore, the radio communications network may comprise a positioning node 15 and a Mobility Management Entity (MME) 16 arranged in a core network of the radio communications network.

The positioning node 15 may also be exemplified as a Location Service (LCS) server, Server Mobile Location Centre (SMLC), Secure User Plane Location (SUPL) Location Platform (SLP) or any server enabled to perform positioning of the user equipment 10.

It should be understood that the term "user equipment" is a non-limiting term which means any wireless terminal, device or node e.g. personal digital assistant (PDA), laptop, mobile, sensor, relay, or even a small base station that are being positioned, e.g. an LCS target in general. The user equipment may also be capable and not capable of performing inter-frequency measurements without gaps, e.g. a user equipment capable of carrier aggregation.

The respective radio base station 12, 13, 14, which are examples of radio network nodes, may also be referred to as e.g. a NodeB, an evolved Node B (eNB, eNode B), a base transceiver station, Access Point Base Station, base station router, or any other network unit capable to communicate with a user equipment 10 within the cells ref,i,j depending e.g. of the radio access technology and terminology used. Also, the respective radio base station 12, 13, 14 may further serve one or more cells and the radio network node serving the user equipment 10 may further be exemplified as a relay node or a beacon node.

For enabling positioning of the user equipment 10 in the radio communications network, according to embodiments herein, the positioning node 15 determines at least one cell for which a System Frame Number (SFN) is known or can be obtained by the user equipment 10. Then, the positioning node 15 generates a message comprising positioning assistance data, which positioning assistance data comprises information associated with the at least one cell. In one example, the at least one cell is indicated as a reference cell in the OTDOA assistance data. In another example, the at least one cell is not indicated as a reference cell in the list of cells but as a neighbour cell in a neighbour cell list comprised in the OTDOA assistance data. The information may be represented by the cell identity or other information identifying the at least one cell, but may also be complemented with other information e.g. carrier frequency, bandwidth, etc. The information may be transmitted in e.g. a separate information element in LTE Positioning Protocol (LPP). The positioning assistance data may also be referred to as assistance data and enables the user equipment 10 to perform positioning measurements. Furthermore, the positioning node 15 transmits the message to the user equipment 10 to be used for positioning the user equipment 10. In the illustrated example the first cell ref, also called reference cell, is the cell serving the user equipment 10, however, the reference cell in the positioning assistance data may not necessarily be the cell serving the user equipment 10.

The user equipment 10 receives the message comprising positioning assistance data with the at least one cell for which the user equipment 10 knows or can obtain the SFN. Knowing the SFN of at least one cell in the received positioning assistance data ensures that the user equipment 10 can utilize the positioning assistance data to perform e.g. RSTD measurements since the SFN is the basis for deriving at least some positioning parameters, such as timing information, to enable RSTD calculation of the different cells. The user equipment 10 then performs a positioning measurement using the positioning assistance data and the SFN of the at least one cell to enable positioning of the user equipment 10. The user equipment 10 may then perform positioning measurements of the cell ref, second cell i and the third cell j.

The user equipment 10 may then report the positioning measurement/s back to the positioning node 15 via the first radio base station 12. The positioning node 15 may calculate the position based on the received positioning measurements. Alternatively or additionally, the user equipment 10 may calculate the position, e.g. in UE-based OTDOA embodiments.

Figure 2:
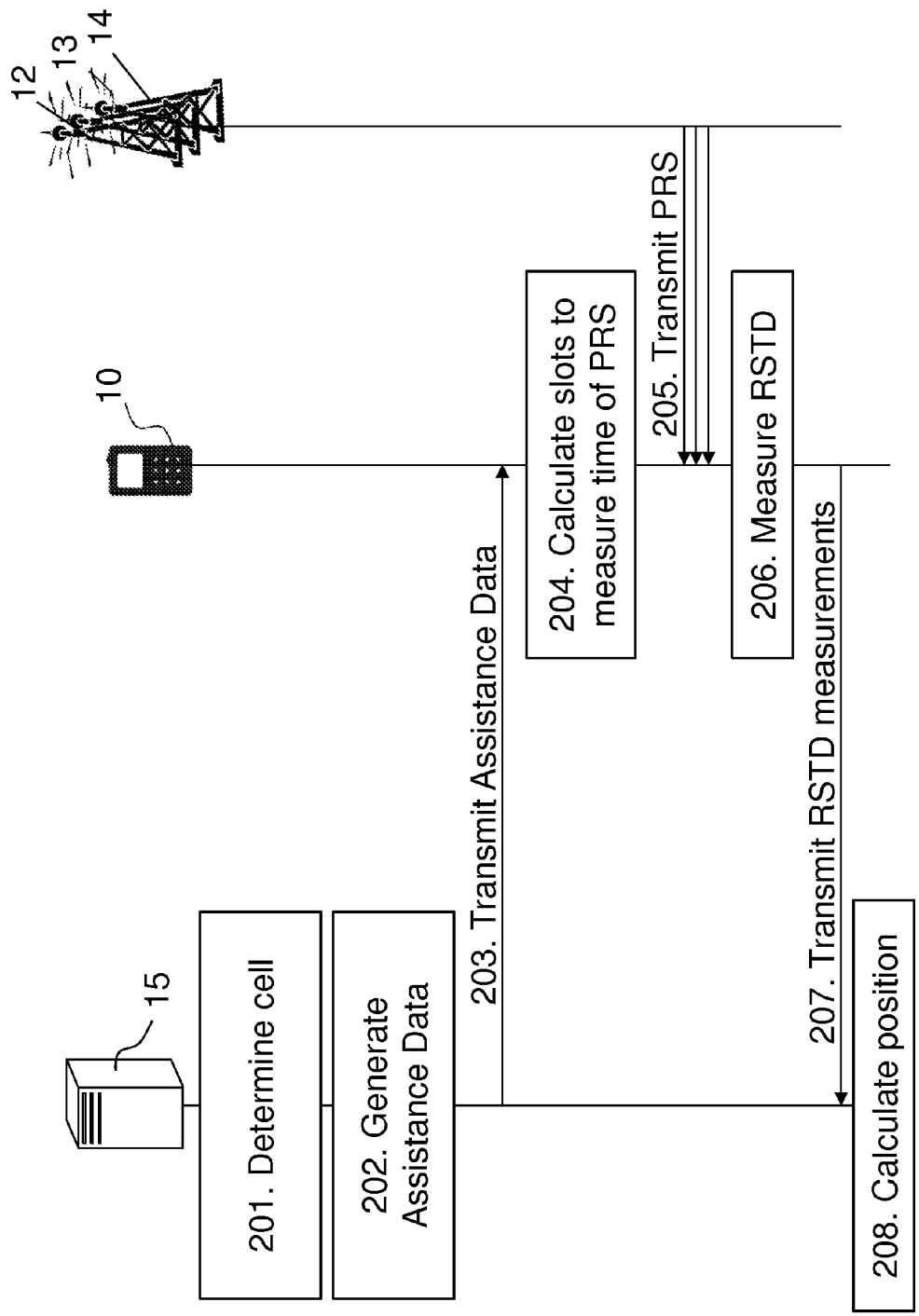
FIG. 2 is a schematic combined flowchart and signaling scheme in a radio communications network.

FIG. 2 is a schematic combined flowchart and signaling scheme for positioning the user equipment 10 in a radio communications network and how the known system frame number is used in the positioning of the user equipment 10. The steps may be performed in any suitable order.

Step 201. The positioning node 15 determines a cell for which a system frame number is known or can be obtained by the user equipment 10. For example, the positioning node 15 may determine a cell ID for a cell serving the user equipment 10, which cell is determined to be the at least one cell for which the system frame number is known based on that it is the cell serving the user equipment 10. Furthermore, the positioning node 15 may determine a cell ID of a cell neighbouring the cell serving the user equipment 10, which cell is determined to be the at least one cell for which the system frame number can be obtained by the user equipment 10 based on that it is the neighbouring cell.

Step 202. The positioning node 15 generates a message comprising positioning assistance data. The positioning assistance data may e.g. be Observed Time Difference of Arrival (OTDOA) assistance data comprising a reference cell indication, information related to the reference cell, a neighbor cell list of neighbor cells and information related to the neighbor cells in the neighbor cell list. The reference cell in the illustrated example is the first cell ref. The reference cell and the neighbor cells may be determined by the positioning node 15 by analyzing signal strengths of the cells, or actually from respective radio base station 12, 13, 14, reported from the user equipment 10.

According to embodiments herein, the positioning assistance data may comprise information associated with the determined cell as a reference cell, or in a neighbor cell list. For example, the first cell ref is registered in the positioning node 15 as the cell serving the user equipment 10 and therefore the SFN of the first cell ref has been known by the user equipment 10, at least by the moment the positioning node 15 received this information. The positioning node 15 then adds this at least one cell into the positioning assistance data and information related to the at least one cell. Information may comprise bandwidth of the at least one cell, bandwidth of a Positioning Reference Signal (PRS) of the at least one cell, periodicity of the PRS in the at least one cell, expected Reference Signal Time Difference (RSTD), RSTD uncertainty, and other information relating to the positioning involving the at least one cell. The at least one cell may be included into the positioning assistance data as a reference cell or a neighbor cell in the neighbor cell list. The positioning assistance data may be represented by Observed Time Difference of Arrival (OTDOA) assistance data, e.g., provided via LTE Positioning Protocol (LPP), and may be used to assist when measuring time difference of arrival of different reference signals of at least the cells comprised in the positioning assistance data. The neighbour cell list is used by the positioning node 15 to provide neighbour cell information for OTDOA assistance data. The neighbour cell list may be sorted according to a best measurement geometry at an a-priori location estimate of the user equipment 10. That is, the user equipment 10, also referred to as the target device, may be expected to provide measurements in increasing neighbor cell list order to the extent that the measurements are available to the user equipment 10.

The message with the positioning assistance data may be triggered to be generated by a location service initiation from the MME 16 but may also be requested by the user equipment 10 or an LCS client. For example, the MME 16 or the user equipment 10 may initiate a service to position the user equipment 10. That is, a geographical location of the user equipment 10 is requested. The positioning node 15 may then receive an order from the MME 16, the user equipment 10 or the LCS Client to position the user equipment 10.

Step 203. The positioning node 15 transmits the message to the user equipment 10. The positioning assistance data in the message enables positioning of the user equipment 10, described in the steps below.

Step 204. The user equipment 10 receives the message and as the SFN is known or can be obtained by the user equipment 10 and also with the aid references signal information in the positioning assistance data, the user equipment 10 knows when in time to measure a PRS or CRS of the cell. As the user equipment 10 may know offset timings and similar information of the second cell i and third cell j, relative to the reference cell, which is in the illustrated example the first cell ref, the user equipment 10 may also determine when to perform measurements on PRSs of the second cell i and third cell j.

In order to obtain a correct reference signal sequence of a measured signal, e.g. PRS or CRS, for the second cell i, the user equipment 10 may need to know a slot number $n_s$ in the second cell i denoted as $n_s^{(i)}$ where s stands for 'slot'. This may be needed for measurements performed on CRS but may also be used for measurements on PRS. The reference signal sequence may be necessary for the signal correlation and is defined as to be mapped to complex-valued modulation symbols used as reference signal for an antenna port e.g. antenna port 6, in slot $n_s^{(i)}$.

Calculating the slot number $n_s^{(i)}$ is disclosed by the two scenarios exemplified below:

Example 1: The case when the second cell i operates on the same frequency as that of the first cell ref, i.e. the two cells have the same Evolved-Universal Terrestrial Radio Access Network (E-UTRAN) absolute radio frequency channel number (earfcn) values, and Example 2: The case when both the second cell i and the first cell ref operate on different frequencies, i.e. have different earfcn values.

The illustrated examples below are given for PRS, but a similar solution is also applicable for CRS.

Example 1

First Cell Ref and Second Cell i Operate on the Same Frequency

The first positioning subframe, comprising the PRS sequence, of the second cell i starts at slot number $n_s^{(i)}$ defined as follows $$n_s^{(i)} = \mathrm{mod}(n_s^{(ref)} + \mathrm{slotNumberOffset} + 2 \times (\Delta_{PRS}^{(i)} - \Delta_{PRS}^{(ref)}) + \mathrm{expectedRSTD}_s, 20)$$

where
$n_s^{(ref)}$ is a first slot number of the first positioning subframe of the first cell ref, slotNumberOffset is a field defined in a OTDOA-NeighbourCellInfoElement IE for the second cell i in the positioning assistance data, $\Delta_{PRS}^{(i)}$ and $\Delta_{PRS}^{(ref)}$ are the PRS subframe offsets in time as defined in TS 36.211, Table 6.10.4.3-1, for cell i and the reference cell ref, respectively, and where according to some embodiments herein, the same reference SFN is used in both cells when defining $\Delta_{PRS}^{(i)}$ and $\Delta_{PRS}^{(ref)}$, $$\mathrm{expectedRSTD}_s = \lfloor 3 \times T_s \times (\mathrm{expectedRSTD} - 8192)/(0.5 \times 10^{-3}) \rfloor$$

is an intermediate parameter denoting the expected RSTD for cell i, counted in the number of full slots, where
expectedRSTD is a field defined in OTDOA-NeighbourCellInfoElement IE for cell i in the positioning assistance data,
$T_s = 1/(15000 \times 2048)$ seconds, and
Mod( . . . , 20) is a modulo 20 operator.

Example 2

First Cell ref and Second Cell i Operate on Different Frequencies

The first positioning subframe of a neighbour cell i starts at slot number $n_s^{(i)}$ defined as follows $$n_s^{(i)} = \mathrm{mod}(n_s^{(ref)} + \mathrm{expectedRSTD}_s + 2 \times \mathrm{prsSubframeOffset}, 20),$$

where
$n_s^{(ref)}$ is a first slot number of the first positioning subframe of the first cell ref,
prsSubframeOffset is the value of the prs-SubframeOffset field in OTDOA-NeighbourCellInfoElement IE for the second cell i in the positioning assistance data, $$\mathrm{expectedRSTD}_s = \lfloor 3 \times T_s \times (\mathrm{expectedRSTD} - 8192)/(0.5 \times 10^{-3}) \rfloor$$

is an intermediate parameter denoting the expected RSTD for the second cell i, counted in the number of full slots, where
expectedRSTD is the field defined in OTDOA-NeighbourCellInfoElement IE for the second cell i in the positioning assistance data,
$T_s = 1/(15000 \times 2048)$ seconds, and
Mod( . . . , 20) is the modulo 20 operator.

$\Delta_{PRS}^{(i)}$ and $\Delta_{PRS}^{(ref)}$ may be found from the positioning reference signal (PRS) configuration index $I_{PRS}$ defined in TS 36.211, Table 6.10.4.3-1, where $I_{PRS}$ corresponds to prs-ConfigurationIndex field in PRS-Info signaled in the OTDOA assistance data for the corresponding cell. For the CRS-based measurements, the $\Delta_{PRS}^{(i)}$ and $\Delta_{PRS}^{(ref)}$ may be assumed to be zeros and the availability of CRS may be assumed in each or selected subframes, where the selected may e.g. be the subframes indicated for measurements by e.g. signaling a certain pattern to the user equipment 10.

In general, in both examples, the reference cell may be different from the serving cell.

The slot number $n_s^{(ref)}$ of the first cell ref, which is the reference cell, may be found from equation $(10 \times n_f + \lfloor n_s/2 \rfloor - \Delta_{PRS}) \mathrm{mod}\, T_{PRS} = 0$ defined in TS 36.211, assuming $$\Delta_{PRS} = \Delta_{PRS}^{(ref)},$$

$T_{PRS}$ is a time index of the PRS defined by PRS configuration index $I_{PRS}$ defined in 3GPP TS 36.211,
$n_f$ is the known SFN of the first cell ref, and
$n_s = n_s^{(ref)}$ is the unknown slot number.

Thus, by knowing the SFN, denoted as $n_f$ in the equations, the user equipment 10 may calculate $n_s^{(ref)}$, which is the slot number of the first cell ref that the user equipment 10 is to perform measurements of the positioning reference signal on. Then, from this calculated reference slot number $n_s^{(ref)}$ and information in the positioning assistance data of cells in neighbor cell list, the user equipment 10 may calculate the slot number $n_s^{(i)}$ of the second cell i. Similarly, the user equipment 10 may calculate the slot number $n_s^{(j)}$ of the third cell j.

When SFN of the first cell ref is not known but the user equipment 10 knows a SFN of the second cell i indicated as a neighbor cell in the positioning assistance data, some embodiments herein specifies the following steps in the user equipment 10:

Find slot number $n_s^{(i)}$ of the second cell i with the known SFN from $(10 \times n_f + \lfloor n_s/2 \rfloor - \Delta_{PRS}) \mathrm{mod}\, T_{PRS} = 0$ where $n_s = n_s^{(i)}$, Using one of the equations described in the two examples, find slot number $n_s^{(ref)}$ of the first cell ref, given the slot number $n_s^{(i)}$ of the second cell i for which SFN is known, e.g. as follows:

$$n_s^{(ref)}=\mod(n_s^{(i)}-\text{slotNumberOffset}-2\times(\Delta_{PRS}^{(i)}-\Delta_{PRS}^{(i)})-\text{expectedRSTD}_s,20),$$

or $$n_s^{(ref)}=\mod(n_s^{(i)}-\text{expectedRSTD}_s-2\times\text{prsSubframeOffset},20).$$

Given slot number $n_s^{(ref)}$, find slot number $n_s$ for every measured cell in the neighbour cell list, e.g. $n_s^{(j)}$.

From the above, it should be noted that at least one cell for which the SFN is known or can be obtained by the user equipment 10 is always present in the positioning assistance data e.g. either as a reference cell or in the neighbour cell list. A person skilled in the art may derive equations that are variations to the above. For example, in a synchronous network one could assume that $\Delta_{PRS}^{(i)}=\Delta_{PRS}^{(ref)}$ which simplifies the equation in Example 1. Another variant is when one assumes that expectedRSTD$_s$=0 in some scenarios or under certain conditions, or certain requirements on the positioning assistance data, which simplifies equations in both Example 1 and Example 2. For example, the user equipment 10 may also calculate the slot number at the transmitter, i.e. excluding the time difference induced by the expected propagation time difference expectedRSTD$_s$, as an intermediate step before the user equipment 10 calculates the slot number at the receiver which is the slot number of interest.

Hence, $n_s^{(ref)}$ and $n_f^{(ref)}$ are defined for the first cell ref which is the cell determined in step 201. The user equipment 10 thus knows when in time a next positioning occasion, e.g. PRS sequence, starts in the first cell ref.

The user equipment 10 needs to find positioning occasions to perform timing measurements in the second cell i and the third cell j to determine the RSTD of respective reference signals in reference to the received signal in the first cell ref. These timing measurements of the positioning occasion of a cell is X in 'mod(X,20)'. X is different for intra- and inter-frequency cases e.g. example 1 and 2 above.

In the corresponding positioning occasion of each cell i or j the user equipment 10) performs timing measurements. Slot number $n_s^{(ref)}$ and SFN number $n_f^{(ref)}$ are used in the equation to find $n_s^{(i)}$ for the second cell i and $n_s^{(j)}$ for the third cell j. $n_s^{(i)}$ is used to find the reference signal sequence of the second cell i and $n_s^{(j)}$ is used to find reference signal for the third cell j. By correlating the received signal with a known PRS sequence, the user equipment 10 finds a correlation peak and then obtains the timing measurement for the second cell i and the third cell j.

When the SFN of a cell, e.g. of the first cell ref, is not known the user equipment 10 can obtain the SFN of the first cell ref by reading a system information sent in the first cell ref. In e.g. Radio Resource Control (RRC) idle mode before camping on the first cell ref, the user equipment 10 may read a broadcast channel from the first radio base station 12, which broadcast channel may comprise a signal carrying the system information of the first cell ref. In RRC connected mode the user equipment 10 periodically checks if there are any changes in the system information and if that is the case the user equipment 10 will acquire the system information from the broadcast channel. The user equipment 10 generally does not read the system information of the neighbour cell, e.g. the second cell i and the third cell j, as this increases power consumption of the user equipment 10 and requires a more complex implementation, but in the example the first user equipment 10 knows the SFN of the serving cell, which may also be the reference cell as illustrated. Due to this reason according to some embodiments herein the positioning node 15, e.g. an E-SMLC sending the positioning assistance data to the user equipment 10, may include the identity of the cell, e.g. first cell ref, serving the user equipment 10 and information related to the cell in the positioning assistance data, e.g. either as a reference cell or as a neighbour cell. This requirement on the positioning assistance data may be included as a rule applicable to the positioning node 15, which may be required to ensure the including of at least one cell, such as cell ID, for which SFN is known to the user equipment 10 being positioned. The positioning node 15 may also follow some rules to make the assumptions about for which cells and when, e.g. in which situations and under which conditions, the user equipment 10 can, i.e. is able to, obtain the SFN which is not known or may be old. Embodiments herein also cover a rule of the user equipment 10, which shall receive the positioning assistance data, which positioning assistance data may comprise identity and information of the first cell ref and also that the first cell ref serves the user equipment 10. Even when a cell has been the serving cell at the moment of creating the positioning assistance data, the user equipment 10 may update itself about the cell's SFN, e.g. the serving cell may change from the moment of creating the positioning assistance data in the positioning node 15 by the moment when the user equipment 10 may need the SFN because the user equipment 10 may not read the SFN of the old serving cell. Note also that the reference cell will typically not change at handover with OTDOA. One of the advantages of embodiments herein is that at handover to the second cell i the reference cell does not change and the positioning assistance data is thus still relevant and does not require any adaptation or resending.

More generally, according to some embodiments, the acquiring of the SFN may comprise obtaining the previously unknown SFN or updating the SFN which may become not available by the time when it is needed even if it was available, e.g. at the time of creation the positioning assistance data, or may be considered as old or out-dated, even if it is still available e.g. in a memory of the user equipment 10.

According to some embodiments herein, the rule requires that at least one cell, e.g. cell ID, for which the user equipment 10 knows the SFN or can obtain the SFN, is included in the positioning assistance data, and the rule may be defined both for the positioning node 15 and the user equipment 10 that receives the positioning assistance data. Such at least one cell may or may not be the first cell ref and may neither be the cell serving the user equipment 10. Thus, the cell with known SFN may be any cell, e.g. a non-serving neighbour cell, or a previously visited cell, and the determination of the at least one cell may be based on obtained information from the user equipment 10, the radio base station 12, or the mobility management entity 16, or based on statistics collected regarding the mobility of the user equipment 10 or other user equipments.

In some embodiments, the user equipment 10 may obtain or acquire the SFN of the reference cell received in the positioning assistance data if the SFN of the reference cell is not yet known to the user equipment 10, e.g. when the reference cell is not the first cell ref serving the user equipment 10 but the second cell i, for which the user equipment 10 can obtain the SFN. Acquiring the SFN of a cell may for example be done by reading a broadcast channel of that cell, and the acquiring of the SFN of the first cell may be triggered by receiving the positioning assistance data, given that the SFN of the reference cell is not known to the user equipment 10, and/or the serving cell is not in the positioning assistance data, and/or there is no other cell in the positioning assistance data for which the SFN is known to the user equipment.

Not including the cell serving the user equipment 10, also referred to as the serving cell, in the positioning assistance data may happen for intra-frequency positioning measurements, e.g. in a home base station, but also for inter-frequency positioning measurements. It may be so that a timing information, such as the SFN, of the cell currently serving the user equipment 10 may not be reliable or not known to the positioning node 15 and thus e.g. the expected RSTD may not be provided, the expected RSTD uncertainty is too large, or the clock drift is too large, resulting in large errors for any timing measurements involving the serving cell. An inter-frequency positioning measurement is a positioning measurement that involves at least one cell on a frequency different from the frequency of the serving cell. For inter-frequency positioning measurements, it may be more advantageous, e.g. from the user equipment 10 complexity point of view, to have all the cells on the same inter-frequency i.e. non-serving frequency, in the positioning assistance data rather than having a mix of frequencies in the positioning assistance data, e.g. by including also the serving cell, in addition to neighbour cells on the other than serving frequency, in the positioning assistance data.

Step 205. The different radio base stations 12, 13, 14 respectively transmit positioning reference signals (PRS) or other reference signals such as Cell-specific Reference Signals (CRS).

Step 206. From the slot numbers known to the user equipment 10 by e.g. the calculations in step 204, the user equipment 10 may then perform time measurements on the transmitted PRS transmitted from the different radio base stations 12, 13, 14. Thus, the user equipment 10 may perform a positioning measurement e.g. the user equipment 10 may measure the time difference of arrival of the reference signals, also referred to as Reference Signal Time Difference (RSTD) measurements, from respective radio base stations 12, 13, 14.

In UTRAN Frequency Duplex Division (FDD), System Frame Number (SFN)-SFN type 2 measurement performed by the user equipment 10 may be used for the OTDOA positioning method. This measurement is the relative timing difference between e.g. the first cell ref and the second cell i based on a primary Common Pilot Channel (CPICH) from the first cell ref and the second cell i. The reported SFN-SFN type 2 from the user equipment 10 is used by the positioning node 15 to estimate the position of the user equipment 10, see below.

Step 207. The user equipment 10 then reports and transmits the RSTD measurements of the received PRS sequences to the positioning node 15 for example via the first radio base station 12.

Step 208. The positioning node 15 receives the RSTD measurements and calculates position of the user equipment 10 based on the received RSTD measurements. For example, the RSTD measurements in combination with the geographical location of the radio base stations 12, 13, 14 and the time that the radio base stations 12, 13, 14 transmitted the PRS sequence gives the positioning node 15 the location or position of the user equipment 10.

Note that Step 208 may be optional since the position may also be calculated in the user equipment 10 when the user equipment 10 has or may obtain the necessary information about the radio network nodes e.g. the locations of the radio base stations 12, 13, 14.

In some embodiments, it may be needed to know the serving cell of the user equipment 10. For example, in OTDOA the knowing of the serving cell by the positioning node 15 makes it possible for the positioning node 15 to include it in the positioning assistance data assuming that the user equipment 10 typically knows the SFN of the serving cell. Further in OTDOA, if the serving cell has changed then the SFN may be not available at the time when it is needed. In E-CID, the user equipment 10 may report timing measurements for the serving cell and after the serving cell change the user equipment 10 and the positioning cell may have different assumptions about the current serving cell since e.g. positioning node 15 may be updated at a lower rate about the serving cell change for a user equipment 10. Similar methods for acquiring the serving cell information may be used for OTDOA and E-CID and potentially other positioning methods as well e.g. UTDOA.

In order to avoid that the user equipment 10 samples the signal and reports the measurement for a new serving cell, whilst the network is not aware of this change, the positioning node 15 may report the serving cell that is registered at the positioning node 15 to the user equipment 10, and/or the user equipment 10 may report the serving cell to the positioning node 15.

Also, by this feature of reporting serving cell or registered serving cell it is avoided that the user equipment 10 accumulates the signal from the old serving cell and from the new serving cell for the same measurement. Thus, as this would cause severe ambiguity in the measurement results, resulting in that the position of the user equipment 10 is determined with large uncertainty, the position of the user equipment 10 is more accurate adding this feature to some embodiments herein.

In some embodiments, a serving cell indicator, e.g. is ServingCell, is included in the positioning assistance data, e.g. in a neighbor cell list and/or in the reference cell information, to indicate the actual serving cell in the list, according to a knowledge of the positioning node 15 at a time of generating the positioning assistance data. Such an indication may be used in a method to resolve that the reported measurements may be misinterpreted by the positioning node 15.

The positioning node 15 may "remember" or store the serving cell information, which may be obtained e.g. via Cell ID request from the radio base station 12 and may transmit the positioning assistance data to the user equipment 10.

According to some embodiments, the user equipment 10 may receive the positioning assistance data from the positioning node 15. Upon receiving the positioning assistance data, the user equipment 10 may check whether the actual serving cell is still the same as indicated in the positioning assistance data. If the serving cell has changed a behavior may be predefined. The user equipment 10 may send a request for the positioning assistance data, for the new serving cell only. The user equipment 10 may also, for example, check whether the new serving cell is still in a previously received positioning assistance data and if it is the user equipment 10 may use this previously received positioning assistance data to determine position, and if it is not, the user equipment 10 may send a request for the positioning assistance data, for the new serving cell.

If a frequency used for communication has also changed with changing the serving cell, the user equipment 10 may, for example, request measurement reconfiguration if the user equipment 10 is not capable of measuring on that frequency without measurement gaps, e.g. by sending an 'inter-frequency handover' indicator or sending a descriptive abort message to a network node.

At handover (HO), the user equipment 10 actually receives the Physical Cell ID (PCI) and E-UTRAN Absolute Radio Frequency Number (earfcn) of the new cell in a HO command. So, according to some embodiments herein, the user equipment 10 may be able to know whether it should request new positioning assistance data or not. If the new serving cell is not in the previous positioning assistance data provided, the user equipment 10 may request new positioning assistance data and the message used may be a positioning assistance data request.

In some embodiments, the positioning node 15 may have the information stored of the serving cell and possibly also the reference cell, which may also be the serving cell, of the user equipment 10 and other user equipments, which are configured by said positioning node 15 for performing the positioning measurement.

Upon receiving a failure indicator with a handover-related reason indication or a positioning assistance data request with a handover-related reason indication, the positioning node 15 may regenerate or update the positioning assistance data, while ensuring the serving cell is included in the list, e.g. see below. In some embodiments, the positioning node 15 may send to the user equipment 10 the positioning assistance data comprising the information about the new serving cell only.

Some embodiments disclose a method whereby the positioning node 15 obtains or acquires the information about the serving cell of the user equipment 10 from different sources/nodes. In some embodiments the positioning node 15 may be required to have means to include the user equipment's 10 serving cell and its related information in the positioning assistance data, which is signaled by the positioning node 15 to the user equipment 10 for performing the positioning measurement.

The information of the serving cell may correspond to; the present serving cell of the user equipment 10, the serving cell of the user equipment 10 after the handover, or both. In the last two cases the network may be in process of performing a handover. In case of multi-carrier systems, also known as carrier aggregation, in which the user equipment 10 is able to receive and/or transmit data over more than one carrier simultaneously, there are more than one serving cell e.g. one primary cell and one or more secondary cells for the user equipment 10. Hence according to embodiments herein, in case of the multi-carrier system, the positioning node 15 may obtain information for the user equipment 101) either about all its serving cells ii) or at least the primary serving cell iii) or at least the serving and a number, N, best secondary cells, which may be a potential primary cell.

The positioning node 15 may obtain the serving cell information using one or more of the following means:

For example; in some embodiments the positioning node 15 may obtain the said serving cell related information, also applicable for the multi-carrier system, from the core network node, e.g. MME 16, which comprises user equipment 10 mobility context or information. The MME 16 may proactively provide the serving cell information of all user equipments or a sub-set of user equipments to the positioning node 15. The MME 16 may also provide this information to the positioning node 15 upon receiving an explicit request from the positioning node 15. The information may also be provided when triggered by an event, e.g. changed serving cell for the user equipment 10. Another way is that MME 16 provides the serving cell information to an evolved-SMLC together with the positioning request.

In some embodiments, the positioning node 15 may obtain the said serving cell related information, also applicable for the multi-carrier system, from a radio network node such as a radio base station. The serving cell related information may be sent over the LPP annex protocol (LPPa) by the radio base station 12 or the serving radio base station, which may comprise UE mobility context or information and also perform the handover. The radio base station 12 or any radio network node which has the information of the serving cell of the user equipment 10 may proactively provide the serving cell information of all user equipments or a sub-set of user equipments to the positioning node 15. The radio network node may also provide this information to the positioning node 15 upon receiving an explicit request from the positioning node 15 or at the handover of the user equipment 10. For example, the radio base station 12 may provide identifiers of all user equipments served by itself to the positioning node 15.

In some embodiments the positioning node 15 obtains the serving cell related information, also applicable for the multi-carrier system, from the user equipment 10 just after the handover or anytime during the session in case serving cell changes. For example, the user equipment 10 may inform the positioning node 15, e.g., over LPP about the completed handover.

Among many advantages provided by methods and apparatus in accordance with embodiments herein, one advantage is that the positioning node 15 is aware of user equipment radio access capabilities. Embodiments herein also enable a true multi-carrier operation for positioning, and provide enhanced positioning performance for next LTE releases that accounts for advanced user equipment capabilities.

A positioning measurement may continue upon handover (HO) and no specific behaviour or additional procedures need to be specified when an OTDOA positioning session is ongoing upon HO. The general handover procedures are defined in 3GPP TS 36.300. To enable this, the standard provides that the reference cell in the OTDOA assistance data is not necessarily the same as the serving cell, which means that after changing the serving cell, the user equipment 10 may avoid requesting new assistance information since the reference cell does not change.

Figure 3:
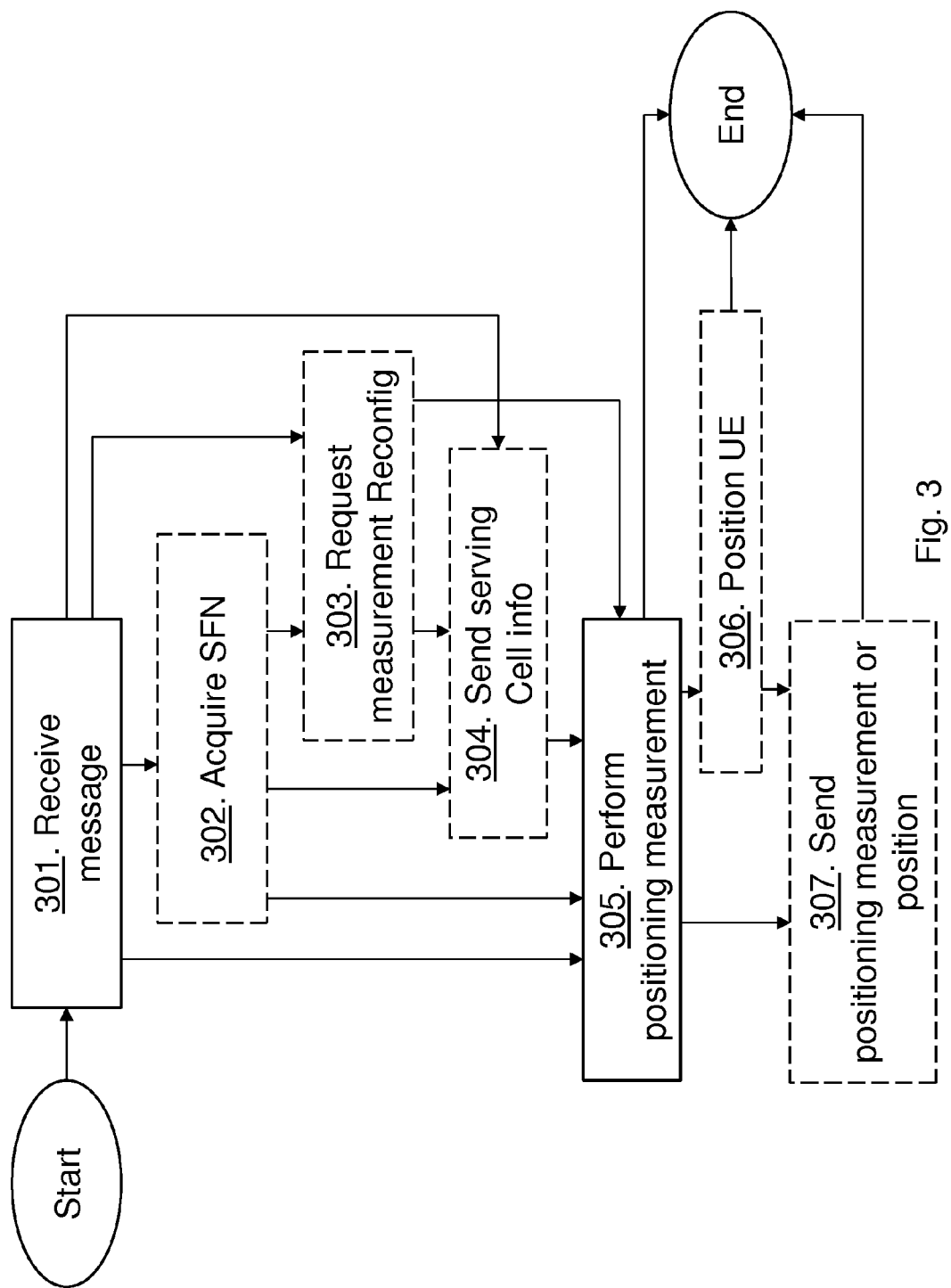
FIG. 3 is a schematic flowchart of a method in a user equipment.

The method steps in the user equipment 10 for enabling positioning of the user equipment 10 in a radio communications network according to some general embodiments will now be described with reference to a flowchart depicted in FIG. 3. The user equipment 10 is served in a first cell ref controlled by a radio network node, such as the radio base station 12, and the user equipment 10 knows or can obtain a system frame number of at least one cell. A positioning node 15 and the radio network node 12 are comprised in the radio communications network. The steps do not have to be taken in the order stated below, but may be taken in any suitable order.

Step 301. The user equipment 10 receives from the positioning node 15, a message comprising positioning assistance data. The positioning assistance data comprises information associated with the at least one cell for which the system frame number is known or can be obtained by the user equipment 10. The positioning assistance data may comprise Observed Time Difference of Arrival, OTDOA, assistance data, and the at least one cell, such as the cell ID of the at least one cell, may be comprised in the OTDOA assistance data either as a reference cell, or in a neighbor cell list.

Furthermore, the positioning assistance data may comprise a serving cell indicator. The serving cell indicator indicates a cell registered in the positioning node 15 as serving the user equipment 10. When the user equipment 10 is currently served by another cell than indicated by the serving cell indicator, e.g. the positioning node 15 has not been updated about the changed serving cell/carrier of the user equipment 10, the user equipment 10 may send a request to the positioning node 15 for the positioning assistance data of the other cell For example, the user equipment 10 may include in the request, request for the information related to the other cell which is currently serving the user equipment 10. Thus, when the first cell is not indicated by the serving cell indicator, the user equipment 10 may send a request for the positioning assistance data of the first cell to the positioning node 15. The user equipment 10 may further check when the other cell is still comprised in the received positioning assistance data and when it is not, send a request to the positioning node 15 for the positioning assistance data of the other cell.

Step 302. The user equipment 10 may acquire the system frame number of at least one cell, e.g. a reference cell, comprised in the positioning assistance data by reading system information of a broadcast channel of the cell when the system frame number of the cell is not known or uncertain. The cell may be any cell, e.g. the cell serving the user equipment 10, also referred to as the serving cell, but also, not the cell serving the user equipment 10. In some embodiments the user equipment 10 is triggered to acquire the system frame number by receiving the message comprising the positioning assistance data and when the cell serving the user equipment 10 is not included in the positioning assistance data. The user equipment 10 may also be triggered to acquire the system frame number when receiving the message comprising the positioning assistance data and no other cell is included in the positioning assistance data for which the user equipment 10 knows the system frame number. Thus, when there is no information of a cell in the positioning assistance data for which the user equipment 10 knows the system frame number, also referred to as timing information, the user equipment 10 may try to obtain the system frame number of at least one cell in the positioning assistance data. The acquiring of the system frame number of a cell comprised in the positioning assistance data may be performed prior to performing positioning measurements. The cell may be a reference cell in the positioning assistance data when the SFN for the reference cell is not known or uncertain. The reference cell may in some embodiments not be the cell serving the user equipment 10. Step 302 is performed in some embodiments as indicated by the dashed line.

Step 303. The user equipment 10 may request measurement reconfiguration when the other cell, mentioned in step 301, has a different frequency than the indicated serving cell in the received message. The user equipment 10 may not be capable of measuring on that different frequency without measurement gaps, since the user equipment 10 is not able to measure inter-frequency cells without gaps in general or the user equipment 10 may request measurement reconfiguration when a carrier aggregation user equipment realizes that the cell is not configured as a primary or secondary cell or is deactivated. Step 303 is performed in some embodiments as indicated by the dashed line.

Step 304. The user equipment may send information to the positioning node 15 indicating a cell serving the user equipment 10, e.g. the first cell. Step 304 is performed in some embodiments as indicated by the dashed line.

Step 305. The user equipment 10 performs a positioning measurement or a plurality of positioning measurements using the positioning assistance data and the system frame number of the at least one cell to enable positioning of the user equipment 10. In some embodiments, the user equipment 10 performs timing measurements of measuring time differences of arrivals of reference signals. A positioning measurement may be time measurements e.g. RSTD of PRS or CRS. Note that more than one positioning measurement may be performed on different reference signals of different radio network nodes.

In some embodiments, the user equipment 10 calculates a slot number of another cell in the positioning assistance data based on the system frame number of the at least one cell. This calculated slot number is to be used when measuring differences in time of arrival of reference signals of the cells when performing the positioning measurements. For example, the time slot is used for generating a signal sequence of a reference signal to be measured and/or is additionally used at the user equipment 10 finding the timing when the reference signal is to be measured.

In some embodiments, the user equipment 10 calculates the slot number based on a slot number of the at least on cell with the system frame number, an expected value of a reference signal time difference, and/or an offset value between information of the at least one cell and the other cell. The offset value may comprise subframe offset between the cells, slot number offset, and/or an offset value of positioning reference signals of the at least one cell and the other cell and the difference between the subframe offsets of the other cell for which the calculating is performed and the cell for which the SFN is known to the user equipment 10. When the at least one cell is not the reference cell, the slot number of the reference cell may be calculated prior calculating the slot number of another cell in the positioning assistance data, where another cell is not the reference cell and not the at least one cell. When the at least one cell is not the reference cell, the slot number of the reference cell may be calculated prior all other slot number calculations for at least cells for which system frame number is not known. The positioning measurement may be performed on a reference signal, which reference signal is a positioning reference signal or a cell-specific reference signal.

Step 306. The user equipment 10 may then calculate its own position. Step 306 is performed in some embodiments as indicated by the dashed line.

Step 307. The user equipment 10 may send or report the positioning measurement to the positioning node 15 and/or the calculated position. Step 307 is performed in some embodiments as indicated by the dashed line.

Figure 4:
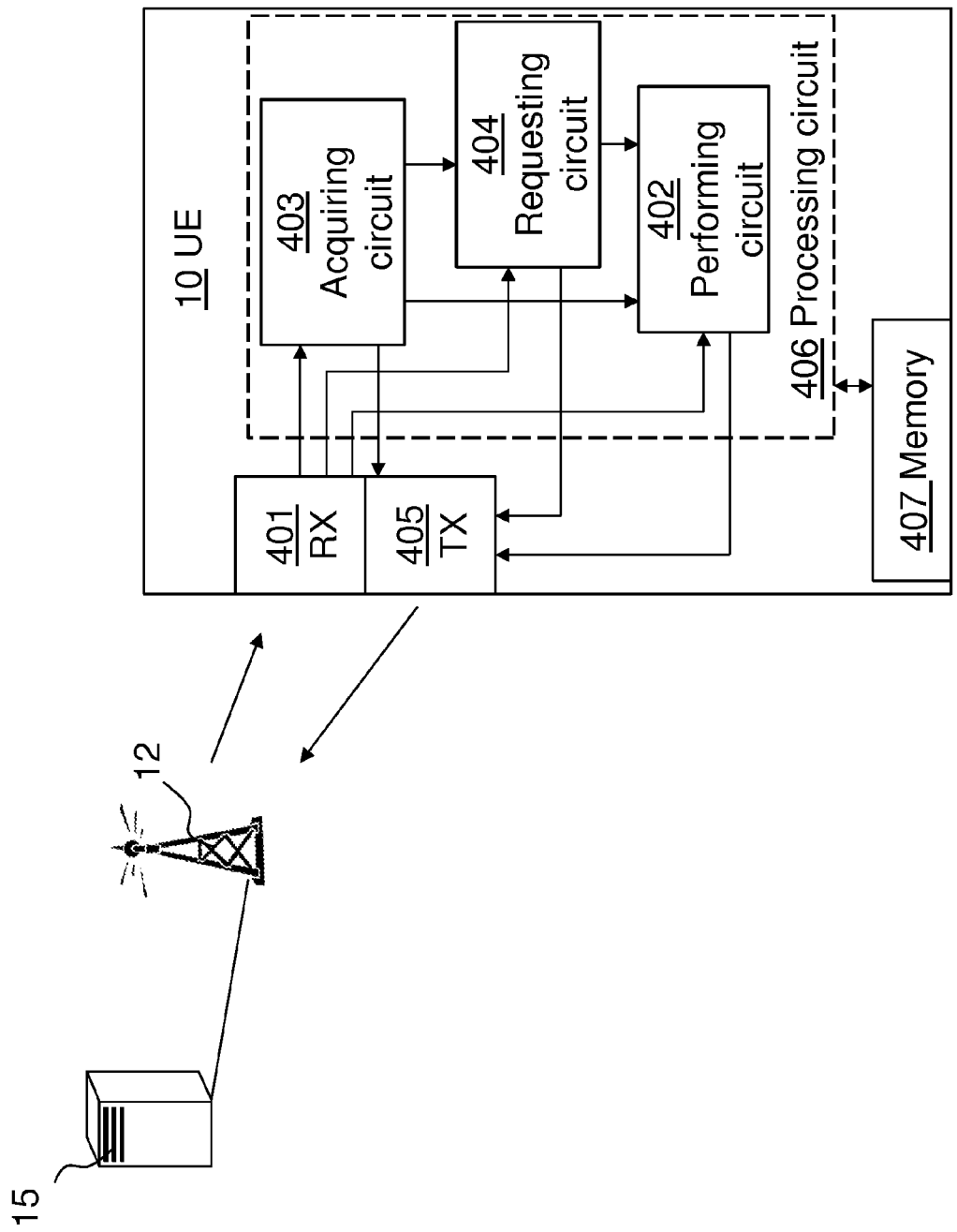
FIG. 4 is a block diagram depicting a user equipment.

FIG. 4 is a block diagram depicting the user equipment 10 for enabling positioning of the user equipment 10 in the radio communications network. The user equipment 10 is configured to be served in a first cell controlled by a radio network node 12, and the user equipment 10 is configured to know or to obtain a system frame number of at least one cell. The user equipment 10, a positioning node 15, and the radio network node 12 are comprised in the radio communications network.

The user equipment 10 comprises a receiver (RX) 401 configured to receive from the positioning node 15, a message comprising positioning assistance data. The positioning assistance data comprises information associated with the at least one cell for which the system frame number is known or can be obtained by the user equipment 10. The at least one cell may be comprised in an OTDOA positioning assistance data either as a reference cell, or in a neighbor cell list. In some embodiments, the received message may further comprise a serving cell indicator. The serving cell indicator indicates a cell registered in the positioning node 15 serving the user equipment 10. When the user equipment 10 is served by another cell than indicated by the serving cell indicator, the user equipment 10 may send a request to the positioning node 15 requesting the positioning assistance data of the other cell. In some embodiment the user equipment 10 may check when the other cell is still comprised in the received positioning assistance data and when it is not, send the request to the positioning node 15 for the positioning assistance data of the other cell.

The user equipment 10 comprises a performing circuit 402 configured to perform a positioning measurement using the positioning assistance data and the system frame number of the at least one cell to enable positioning of the user equipment 10. In some embodiments, the performing circuit 402 is configured to perform timing measurements of measuring time differences of arrivals of reference signals.

In some embodiments, the performing circuit 402 may be configured to calculate a slot number of another cell in the positioning assistance data based on the system frame number of the at least one cell. This calculated slot number is to be used when measuring differences in time of arrival of reference signals of the cells when performing the positioning measurement. In some embodiments, the performing circuit 402 is configured to calculate the slot number based on a slot number of the at least one cell with the system frame number, an expected value of a reference signal time difference, and/or an offset value between information of the at least one cell and the other cell. The offset value may comprise subframe offset between the cells, slot number offset, and/or an offset value of positioning reference signals of the at least one cell and the other cell and the difference between the subframe offsets of the other cell for which the calculating is performed and the cell for which the system frame number is known to the user equipment 10. The positioning measurement may be performed on a reference signal, which reference signal is a positioning reference signal or a cell-specific reference signal.

In some embodiments, the user equipment 10 may further comprise an acquiring circuit 403 configured to acquire the system frame number of at least one cell, e.g. a reference cell, comprised in the positioning assistance data by reading a broadcast channel of the cell when the system frame number of the cell is not known and/or SFN of other cells in the assistance data are not known. The cell may be any cell, either the cell serving the user equipment 10 or not the cell serving the user equipment 10. In some embodiments the acquiring circuit 403 is configured to be triggered to acquire the system frame number by receiving the message comprising the positioning assistance data and when a cell serving the user equipment 10 is not included in the positioning assistance data. The acquiring circuit 403 may also be configured to get triggered to acquire the system frame number when receiving the message comprising the positioning assistance data and no other cell is included in the positioning assistance data for which the user equipment 10 knows the system frame number. The system frame number information may be acquired when no information of a cell included in the positioning assistance data for which the system frame number is known. The acquiring circuit 403 may be configured to acquire the system frame number of a cell comprised in the positioning assistance data prior to performing positioning measurements. The cell may be a reference cell in the positioning assistance data when the SFN for the reference cell is not known or uncertain.

In some embodiments, the user equipment 10 further comprises a requesting circuit 404. When the first cell is not indicated by the serving cell indicator, the requesting circuit 404 may send a request for the positioning assistance data of the first cell to the positioning node 15. As the user equipment 10 is served by another cell than indicated by the serving cell indicator, the requesting circuit 404 is configured to request measurement reconfiguration when the other cell has a different frequency than the indicated serving cell in the received message and the user equipment 10 is not capable of measuring on that different frequency without measurement gaps. This may be because the user equipment 10 is not able to measure inter-frequency cells without gaps in general or the carrier aggregation user equipment 10 realizes that the cell is not configured as a primary or secondary cell or is deactivated.

In some embodiments, the user equipment comprises a transmitter (TX) 405 configured to send information to the positioning node 15 indicating a cell serving the user equipment 10 e.g. the first cell, or to transmit the positioning measurement to the positioning node 15.

The embodiments herein for enabling positioning of the user equipment 10 in the radio communications network may be implemented through one or more processors, such as a processing circuit 406 in the user equipment 10 depicted in FIG. 4, together with computer program code for performing the functions and/or method steps of the embodiments herein. The program code mentioned above may also be provided as a computer program product, for instance in the form of a data carrier carrying computer program code for performing the present solution when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

The user equipment 10 may further comprise a memory 407. The memory 407 may comprise one or more memory units and may be used to store for example data such as measured cell identities, time measurements, slot numbers, SFNs e.g. of the first subframe of the last positioning occasion for any positioning measurements or a specific measured cell, positioning data, applications to perform the methods herein when being executed on the user equipment 10 or similar. The system frame number may be acquired from the memory 407.

The user equipment 10 may receive a DL radio signal through an antenna and may typically down-convert the received radio signal to an analogue baseband signal in a front end receiver. The baseband signal may be spectrally shaped by an analogue filter that has a bandwidth BW, and the shaped baseband signal generated by the filter may be converted from analogue to digital form by an analogue-to-digital converter (ADC). The digitized baseband signal may further be spectrally shaped by a digital filter that has a bandwidth, which corresponds to the bandwidth of synchronization signals or symbols included in the DL signal. The shaped signal generated by the filter may be provided to a cell search unit that carries out one or more methods of searching for cells as specified for the particular communication system, e.g., 3G LTE. Typically, such methods involve detecting predetermined primary and/or secondary synchronization channel (P/S-SCH) signals in the received signal. The digitized baseband signal may also be provided by the ADC to a digital filter that has a bandwidth, and the filtered digital baseband signal may be provided to a processor that implements a fast Fourier transform (FFT) or other suitable algorithm that generates a frequency-domain (spectral) representation of the baseband signal. A channel estimation unit may receive signals from the processor and generate a channel estimate for each of several subcarriers and cells based on control and timing signals provided by a control unit, which also provides such control and timing information to the processor. The estimator may provide the channel estimates to a decoder and a signal power estimation unit. The decoder, which also receives signals from the processor, may be suitably configured to extract information from RRC or other messages and typically generate signals subject to further processing in the user equipment. The estimator may generate received signal power measurements, e.g., estimates of reference signal received power (RSRP), received subcarrier power $S_i$, signal to interference ratio (SIR), etc.). The estimator may generate estimates of RSRP, reference signal received quality (RSRQ), received signal strength indicator (RSSI), received subcarrier power, signal to interference ratio (SIR), and other relevant measurements, in various ways in response to control signals provided by the control unit. Power estimates generated by the estimator are typically used in further signal processing in the user equipment 10. The estimator or the searcher for that matter may be configured to include a suitable signal correlator for handling the PRS and other signals described above.

Figure 5:
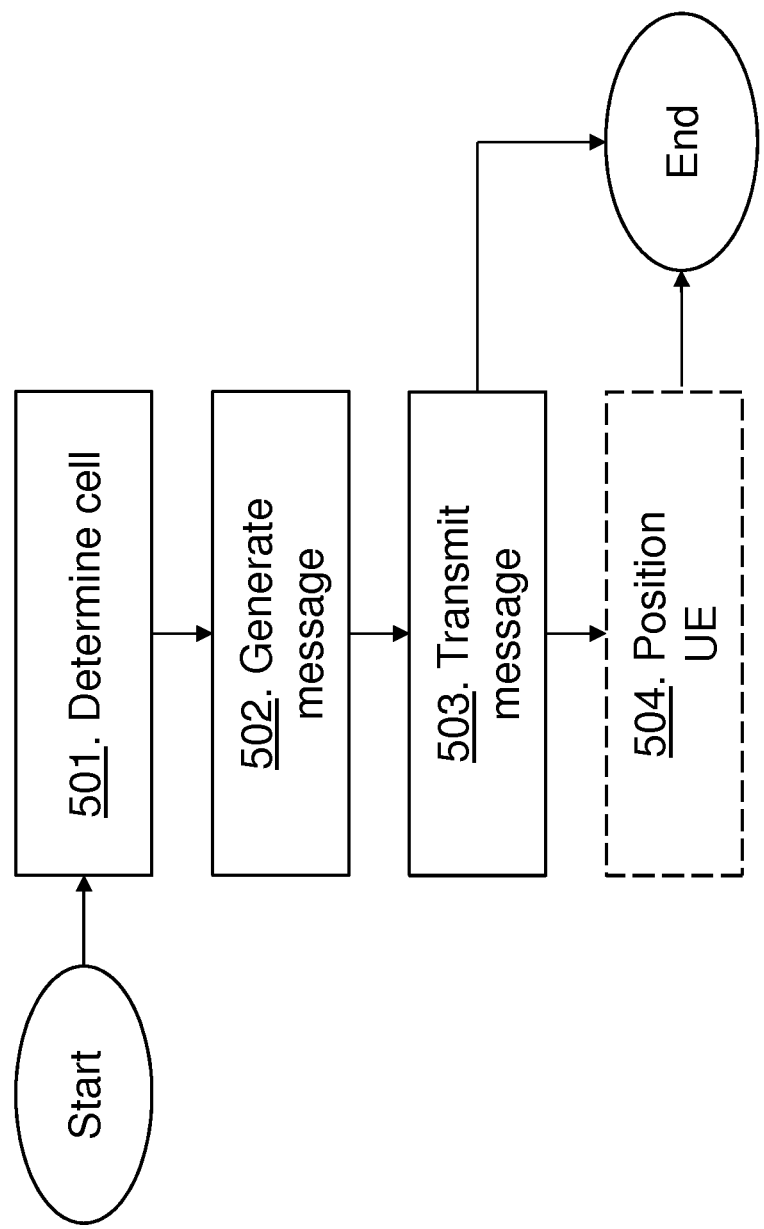
FIG. 5 is a schematic flowchart of a method in a positioning node.

The method steps in the positioning node 15 for enabling positioning of a user equipment 10 in the radio communications network, according to some general embodiments will now be described with reference to a flowchart depicted in FIG. 5. The user equipment 10 is served in a first cell ref controlled by the radio network node 12. The positioning node 15 and the radio network node 12 are comprised in the radio communications network. The steps do not have to be taken in the order stated below, but may be taken in any suitable order.

Step 501. The positioning node 15 determines at least one cell for which a System Frame Number (SFN) is known or can be obtained by the user equipment 10. Determining that the at least one cell for which the system frame number is known by the user equipment 10 may in some embodiments comprise to determine that the at least one cell is a cell serving the user equipment 10. The positioning node 15 may obtain the information about the serving cell of the user equipment 10. Determining that the at least one cell for which the system frame number can be obtained by the user equipment 10 may comprise to determine that the at least one cell is a neighbouring cell of a cell serving the user equipment 10.

That the at least one cell is a cell for which a System Frame Number (SFN) is known or can be obtained by the user equipment 10 may be determined by obtaining an indication. The obtaining may comprise receiving from the user equipment 10 or the first radio base station 12 or another network node. In another embodiment, the positioning node 15 may also exploit the requirement that the SFN of the serving cell is typically known to the user equipment 10 and the user equipment 10 typically stores this information for a at least some pre-defined time. The positioning node 15 may also determine the at least one cell for which the SFN is known based on previous positioning measurement reports from the user equipment 10, e.g., for another positioning node attempted earlier but for which the positioning quality requirement was not met.

The indication may regard which cell is serving the user equipment 10 or is a neighbouring cell to a cell serving the user equipment 10. The indication may be obtained by receiving it from a network node, the user equipment 10 or another user equipment upon or without request from the positioning node 15. The network node may be represented by a core network node, such as the MME 16, the radio network node 12, or another radio network node. The positioning node 15 may then update its information regarding which cell is serving the user equipment 10. In some embodiments the radio communications network is a multi-carrier system and the determining comprises obtaining the information for the user equipment 10 on at least one or any combination of: about all cells serving the user equipment 10, a primary serving cell serving the user equipment 10, and/or a cell serving the user equipment 10 and a number, N, best secondary cells, which may be a potential primary serving cell.

Step 502. The positioning node 15 generates a message comprising positioning assistance data. The positioning assistance data comprises information associated with the at least one cell. The positioning assistance data may, as stated above, comprise Observed Time Difference of Arrival (OTDOA) assistance data and the at least one cell is comprised in the OTDOA assistance data either as a reference cell, or in a neighbor cell list. The information may comprise an identity of the at least one cell or other information identifying the at least one cell. The at least one cell may or may not be comprised as the reference cell in the positioning assistance data. The positioning node 15 may in some embodiments generate the message by adding a serving cell indicator to the message indicating a cell registered in the positioning node 15 as serving the user equipment 10.

Step 503. The positioning node 15 transmits the message to the user equipment 10. The positioning assistance data in the message enables positioning of the user equipment 10.

Step 504. The positioning node 15 may receive one or more positioning measurements from the user equipment 10. The positioning node 15 may then use the positioning measurement to determine the position of the user equipment 10. Step 504 is performed in some embodiments as indicated by the dashed line.

Figure 6:
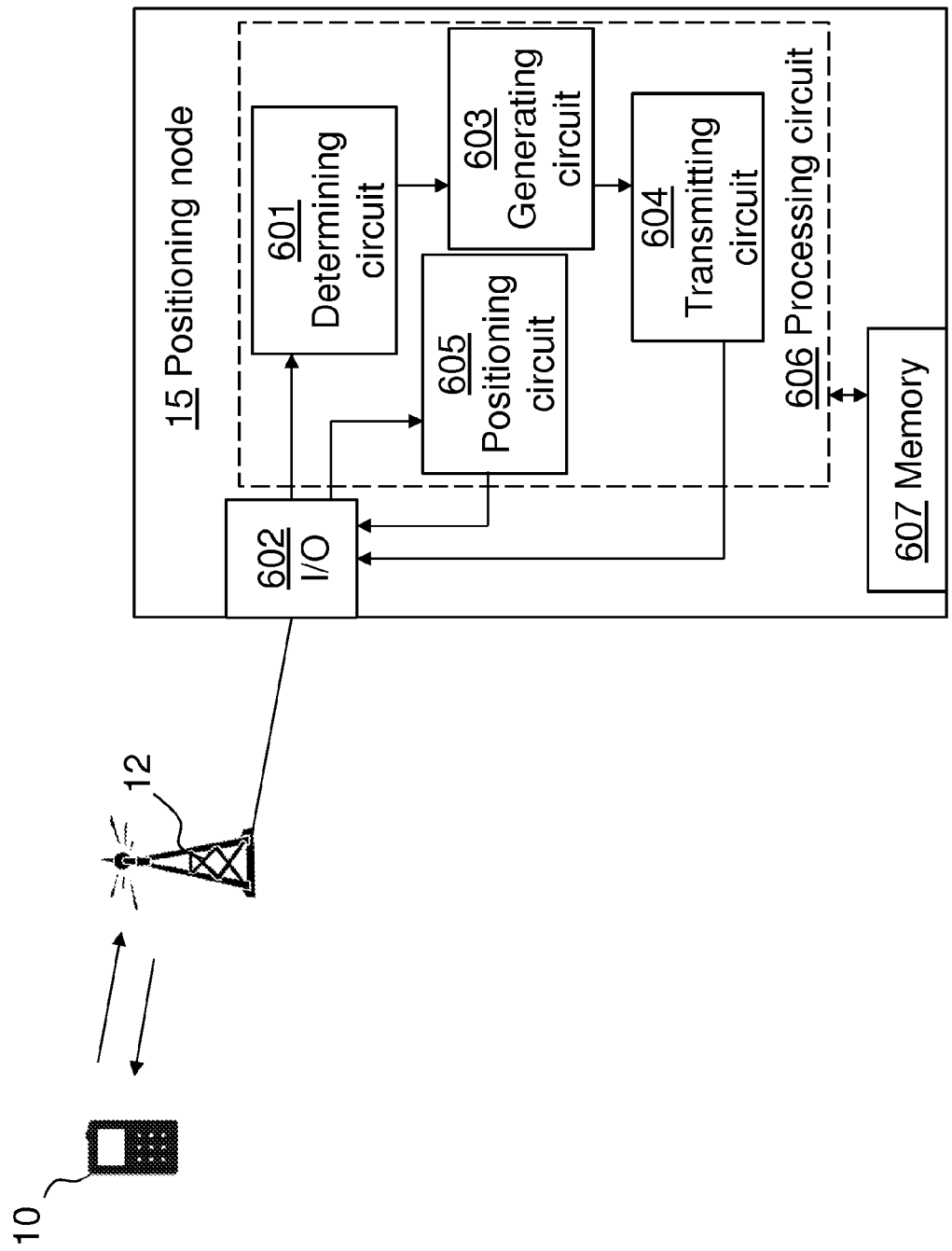
FIG. 6 is a block diagram depicting a positioning node.

FIG. 6 is a block diagram of a positioning node 15 arranged to perform the method steps for enabling positioning of the user equipment 10 in the radio communications network. The user equipment 10 is served in a first cell ref controlled by the radio network node 12.

The positioning node 15 comprises a determining circuit 601 configured to determine at least one cell for which a System Frame Number (SFN) is known or can be obtained by the user equipment 10. That the at least one cell for which the system frame number is known by the user equipment 10 may in some embodiments be determined in that the at least one cell is a cell serving the user equipment 10. Determining that the at least one cell for which the system frame number can be obtained by the user equipment 10 may comprise to determine that the at least one cell is a neighbouring cell of a cell serving the user equipment 10.

That the at least one cell is a cell for which a System Frame Number (SFN) is known or can be obtained by the user equipment 10 may be determined by obtaining an indication. The indication may regard which cell is serving the user equipment 10 or is a neighbouring cell to a cell serving the user equipment 10. The indication may be obtained from a network node, the user equipment 10 or another user equipment over an input/output (I/O) interface 602. The network node may be represented by a core network node, such as the MME 16, the radio network node 12, or another radio network node. In some embodiments the radio communications network is a multi-carrier system and the determining circuit 601 may be configured to obtain the information for the user equipment 10 on at least one of: about all cells serving the user equipment 10, a primary serving cell serving the user equipment 10, and/or a cell serving the user equipment 10 and a number, N, best secondary cells, which may be a potential primary serving cell.

The positioning node 15 further comprises a generating circuit 603 configured to generate a message comprising positioning assistance data. The positioning assistance data comprises information associated with the at least one cell. The positioning assistance data may, as stated above, comprise Observed Time Difference of Arrival (OTDOA) assistance data and the at least one cell is comprised in the OTDOA assistance data either as a reference cell, or in a neighbor cell list. The at least one cell may or may not be comprised as the reference cell in the positioning assistance data. The generating circuit 603 may in some embodiments be configured to generate the message by adding a serving cell indicator to the message indicating a cell registered in the positioning node 15 serving the user equipment 10.

Furthermore, the positioning node 15 may comprise a transmitting circuit 604 configured to transmit the message to the user equipment 10. The positioning assistance data in the message enables positioning of the user equipment 10.

Additionally, the positioning node 15 may comprise a positioning circuit 605 configured to receive a positioning measurement from the user equipment 10 via the input/output interface 602 which may be used to position the user equipment 10.

The embodiments herein for enabling positioning of the user equipment 10 in the radio communications network may be implemented through one or more processors, such as a processing circuit 606 in the positioning node 15 depicted in FIG. 6, together with computer program code for performing the functions and/or method steps of the embodiments herein. The program code mentioned above may also be provided as a computer program product, for instance in the form of a data carrier carrying computer program code for performing the present solution when being loaded into the positioning node 15. One such carrier may be in the form of a CD ROM disc. It is however feasible with other data carriers such as a memory stick. The computer program code may furthermore be provided as pure program code on a server and downloaded to the positioning node 15.

The positioning node 15 may further comprise a memory 607. The memory 607 may comprise one or more memory units and may be used to store for example data such as cell IDs, cells serving the UE 10 e.g. the last one or during the certain period of time, neighbouring cells to a certain cell, time measurements, positioning data, applications to perform the methods herein when being executed on the positioning node 15 or similar.

In the drawings and specification, there have been disclosed exemplary embodiments herein. However, many variations and modifications may be made to these embodiments without substantially departing from the principles of the embodiments. Accordingly, although specific terms are employed, they are used in a generic and descriptive sense only and not for purposes of limitation, the scope of the invention being defined by the following claims.

The invention claimed is:

1. A method of enabling positioning of a user equipment (UE) in a radio communication network having a positioning node and a radio network node controlling a first cell serving the UE, in which the UE knows or can obtain a system frame number of at least one cell in the radio communication network, the method comprising:
   receiving, in the UE from the positioning node, a message comprising positioning assistance data that includes information associated with the at least one cell of which the system frame number is known or can be obtained by the UE; and
   performing a positioning measurement using the positioning assistance data and the system frame number to enable positioning of the UE;
   wherein the positioning assistance data comprises Observed Time Difference of Arrival (OTDOA) assistance data, and the at least one cell is represented in the OTDOA assistance data either as a reference cell or in a neighbor cell list;
   wherein the positioning measurement is a Reference Signal Time Difference (RSTD) measurement that uses the OTDOA assistance data and the system frame number of the at least one cell to enable positioning of the user equipment;
   wherein the RSTD measurement is a relative received timing difference between a neighbor cell and the reference cell; and
   wherein the positioning node is not in a Radio Access Network (RAN) portion of the radio communication network.

2. The method of claim 1, wherein performing the positioning measurement comprises calculating a slot number of another cell in the positioning assistance data based on the system frame number, and using the slot number when measuring differences in times of arrival of reference signals of cells.

3. The method of claim 2, wherein calculating the slot number is based on at least one of a slot number of the at least one cell corresponding to the system frame number, an expected value of a reference signal time of arrival difference, and an offset value between timing of the at least one cell and the other cell.

4. The method of claim 1, wherein the positioning measurement is based on a reference signal that is either a positioning reference signal or a cell-specific reference signal.

5. The method of claim 1, further comprising acquiring the system frame number of at least one cell represented in the positioning assistance data before performing the positioning measurement.

6. The method of claim 5, wherein the at least one cell is a reference cell in the positioning assistance data when the system frame number of the reference cell is indeterminate.

7. The method of claim 6, wherein the reference cell is not serving the UE.

8. The method of claim 5, wherein acquiring the system frame number is triggered when the message comprising the positioning assistance data is received and when either a cell serving the UE is not included in the positioning assistance data or no cell for which the UE knows the system frame number is included in the positioning assistance data.

9. The method of claim 1, wherein the message received further comprises a serving cell indicator indicating a cell registered in the positioning node serving the UE, and when the serving cell indicator does not indicate the first cell, the UE sends a request for positioning assistance data of the first cell to the positioning node.

10. The method of claim 9, further comprising requesting measurement reconfiguration when the first cell has a frequency different from a frequency of the serving cell indicated in the received message.

11. The method of claim 1, further comprising sending information to the positioning node indicating the first cell as the cell serving the UE.

12. A method in a positioning node of enabling positioning of a user equipment (UE) in a radio communication network that includes the positioning node and a radio network node controlling a first cell serving the UE, the method comprising:
   determining, in the positioning node, at least one cell for which a system frame number is known or can be obtained by the UE;
   generating a message comprising positioning assistance data that includes information associated with the at least one cell; and
   transmitting the message to the UE, whereby the positioning assistance data in the message enables positioning of the UE;

wherein the positioning assistance data comprises Observed Time Difference of Arrival (OTDOA) assistance data, and the at least one cell is represented in the OTDOA assistance data either as a reference cell or in a neighbor cell list;

wherein the positioning measurement is a Reference Signal Time Difference (RSTD) measurement that uses the OTDOA assistance data and the system frame number of the at least one cell to enable positioning of the user equipment; and wherein the RSTD measurement is a relative received timing difference between a neighbor cell and the reference cell.

13. The method of claim 12, wherein determining the at least one cell comprises determining either that the at least one cell is a cell serving the UE or that the at least one cell is a neighbor cell of a cell serving the UE.

14. The method of claim 13, wherein determining either that the at least one cell is a cell serving the UE or that the at least one cell is a neighbor cell of a cell serving the UE comprises obtaining an indication of either which cell is serving the UE or which cell is a neighbor cell, and the indication is obtained from a network node, the UE, or another UE.

15. The method of claim 14, wherein generating the message comprises adding a serving cell indicator to the message indicating a cell registered in the positioning node serving the UE.

16. The method of claim 12, wherein the radio communication network is a multi-carrier network, and the determining comprises obtaining information for the UE on at least one of: all cells serving the UE; a primary serving cell serving the UE; and a cell serving the UE and a number of best secondary cells that are potential primary serving cells.

17. A user equipment (UE) for enabling positioning of the UE in a radio communication network having a positioning node and a radio network node controlling a first cell serving the UE, in which the UE is configured to know or to obtain a system frame number of at least one cell, the UE comprising:

a receiver configured to receive from the positioning node a message comprising positioning assistance data that includes information associated with the at least one cell for which the system frame number is known or can be obtained by the UE; and a performing circuit configured to perform a positioning measurement using the positioning assistance data and the system frame number of the at least one cell to enable positioning of the UE;

wherein the positioning assistance data comprises Observed Time Difference of Arrival (OTDOA) assistance data, and the at least one cell is represented in the OTDOA assistance data either as a reference cell or in a neighbor cell list;

wherein the positioning measurement is a Reference Signal Time Difference (RSTD) measurement that uses the OTDOA assistance data and the system frame number of the at least one cell to enable positioning of the user equipment;

wherein the RSTD measurement is a relative received timing difference between a neighbor cell and the reference cell; and wherein the positioning node is not in a Radio Access Network (RAN) portion of the radio communication network.

18. The UE of claim 17, wherein the performing circuit is configured to calculate a slot number of another cell in the positioning assistance data based on the system frame number of the at least one cell, which slot number is used when measuring differences in times of arrival of reference signals of the cells when performing the positioning measurement.

19. The UE of claim 18, wherein the performing circuit is configured to calculate the slot number based on at least one of a slot number of the at least one cell, the system frame number, an expected value of a reference signal time of arrival difference, and an offset value between timing of the at least one cell and the other cell.

20. The UE of claim 17, wherein the performing circuit is configured to perform the positioning measurement based on a reference signal, and the reference signal is a positioning reference signal or a cell-specific reference signal.

21. The UE of claim 17, further comprising an acquiring circuit configured to acquire a system frame number of a cell represented in the positioning assistance data before a positioning measurement is performed.

22. The UE of claim 21, wherein the cell represented in the positioning assistance data is a reference cell when the system frame number of the reference cell is indeterminate.

23. The UE of claim 22, wherein the reference cell is not a cell serving the UE.

24. The UE of claim 21, wherein the acquiring circuit is configured to be triggered when the message comprising positioning assistance data is received and when either a cell serving the UE is not included in the positioning assistance data or no cell for which the UE knows the system frame number is included in the positioning assistance data.

25. The UE of claim 17, wherein the message further comprises a serving cell indicator indicating a cell registered in the positioning node as serving the UE; and when the first cell is not indicated by the serving cell indicator, the UE is configured via a requesting circuit to request positioning assistance data of the first cell from the positioning node.

26. The UE of claim 25, wherein the requesting circuit is configured to request measurement reconfiguration when the first cell has a frequency different from a frequency of the serving cell indicated in the message.

27. The UE of claim 17, further comprising a transmitter configured to transmit information to the positioning node indicating the first cell as the cell serving the UE.

28. A positioning node for enabling positioning of a user equipment (UE) in a radio communication network including the positioning node and a radio network node controlling a first cell serving the UE, the positioning node comprising:

a determining circuit configured to determine at least one cell for which a system frame number is known or can be obtained by the UE;

a generating circuit configured to generate a message comprising positioning assistance data that includes information associated with the at least one cell; and a transmitting circuit configured to transmit the message to the UE, whereby the positioning assistance data in the message enables positioning of the UE;

wherein the positioning assistance data comprises Observed Time Difference of Arrival (OTDOA) assistance data, and the at least one cell is represented in the OTDOA assistance data either as a reference cell or in a neighbor cell list;

wherein the positioning measurement is a Reference Signal Time Difference (RSTD) measurement that uses the OTDOA assistance data and the system frame number of the at least one cell to enable positioning of the user equipment; and wherein the RSTD measurement is a relative received timing difference between a neighbor cell and the reference cell.

29. The positioning node of claim 28, wherein the determining circuit is configured to determine the at least one cell for which the system frame number is either known when the at least one cell is a cell serving the UE or can be obtained by the UE when the at least one cell is a neighbor cell of a cell serving the UE.

30. The positioning node of claim 29, wherein the determining circuit is configured to obtain an indication of which cell is serving the UE or is a neighbor cell, and the indication is obtained from a network node, the UE, or another UE.

31. The positioning node of claim 28, wherein the generating circuit is configured to add a serving cell indicator to the message indicating a cell registered in the positioning node serving the UE.

32. The positioning node of claim 28, wherein the radio communication network is a multi-carrier network, and the determining circuit is configured to obtain information for the UE on at least one of: all cells serving the UE; a primary serving cell serving the UE; and a cell serving the UE and a number of best secondary cells that are serving cells.

* * * * *